US012440040B2

(12) United States Patent
Ocegueda Gallaga et al.

(10) Patent No.: US 12,440,040 B2
(45) Date of Patent: Oct. 14, 2025

(54) AIR BED VALVE (71) Applicant: BELGRAVIA WOOD LIMITED, Tortola (VG)

(72) Inventors: Victor Hugo Ocegueda Gallaga, Baja California (MX); Chaolong Lan, Shenzhen (CN); Minglian Ma, Shenzhen (CN); May Kong Wong, Gunangdong (CN)

(73) Assignee: BELGRAVIA WOOD LIMITED, Tortola (VG)

( * ) Notice: Subject to any disclaimer, the term of this patent is extended or adjusted under 35 U.S.C. 154(b) by 898 days.

(21) Appl. No.: 17/425,855

(22) PCT Filed: Jan. 25, 2020

(86) PCT No.: PCT/US2020/015123
§ 371 (c)(1),
(2) Date: Jul. 26, 2021

(87) PCT Pub. No.: WO2020/154711
PCT Pub. Date: Jul. 30, 2020

(65) Prior Publication Data
US 2022/0125213 A1 Apr. 28, 2022

(30) Foreign Application Priority Data
Jan. 25, 2019 (CN) .......................... 201920129792.0

(51) Int. Cl.
*A47C 27/08* (2006.01)
*F16K 15/20* (2006.01)
(52) U.S. Cl.
CPC .......... *A47C 27/082* (2013.01); *F16K 15/202* (2013.01); *F16K 15/205* (2013.01)

(58) Field of Classification Search
CPC ... A47C 27/082; A47C 27/081; A47C 27/087; F16K 15/20; F16K 15/205; F16K 15/202
See application file for complete search history.

(56) References Cited

U.S. PATENT DOCUMENTS 4,141,770 A * 2/1979 Mollura .............. B29C 66/1122
156/218
4,328,599 A * 5/1982 Mollura ............... A47C 27/088
5/682

(Continued)

FOREIGN PATENT DOCUMENTS

CN 2632437 Y 8/2004
CN 110546417 A 12/2019
(Continued)

*Primary Examiner* — Justin C Mikowski
*Assistant Examiner* — Alison N Labarge
(74) *Attorney, Agent, or Firm* — TROUTMAN PEPPER LOCKE LLP; Christopher C. Close, Jr.; Korbin M. Blunck (57) ABSTRACT The disclosed technology includes an air valve assembly for providing flexibility for a user when inflating an inflatable air mattress. The air valve assembly can include a base configured to attach to a portion of the inflatable air mattress, a middle valve configured to attach to the base portion and having a first diameter, a diaphragm member configured to attach to the middle valve, and a cap configured to removably couple to a portion of the air valve. The assembly can further include an adapter configured to detachably attach to the middle valve portion. The adapter can have a portion with a second diameter that is smaller than the first diameter such that when the adapter is attached, a user may use an inflation device with a smaller dimensioned output.

18 Claims, 11 Drawing Sheets

(56) References Cited

U.S. PATENT DOCUMENTS

| | | | |
|---|---|---|---|
| 7,694,372 B1 | 4/2010 | Boyd | |
| 2003/0075218 A1* | 4/2003 | Lau | F16K 15/148 137/223 |
| 2006/0130240 A1 | 6/2006 | Hsu | |
| 2007/0074760 A1* | 4/2007 | Wu | F16K 15/063 5/706 |
| 2009/0320211 A1* | 12/2009 | Lau | A47C 27/087 5/713 |
| 2012/0048392 A1* | 3/2012 | Song | F16K 15/20 137/224 |
| 2012/0090699 A1* | 4/2012 | Lau | F16K 15/202 137/231 |
| 2016/0186874 A1* | 6/2016 | Lin | F16K 15/205 137/232 |
| 2016/0223095 A1* | 8/2016 | Sando | F16K 15/205 |

FOREIGN PATENT DOCUMENTS

| | | |
|---|---|---|
| CN | 209807775 U | 12/2019 |
| GB | 2208353 A | 3/1989 |
| WO | 0218825 A1 | 3/2002 |
| WO | WO-2018201371 A1 * 11/2018 | ............ A47C 27/081 |

* cited by examiner

AIR BED VALVE

CROSS-REFERENCE TO RELATED APPLICATIONS

This application is a national stage application, filed under 35 U.S.C. § 371, of International Patent Application No. PCT/US2020/015123, filed on 25 Jan. 2020, which claims benefit under 35 U.S.C. § 119(a), of Chinese Patent App. No. 2019201297920, filed 25 Jan. 2019, the entire contents and substance of which are incorporated herein by reference in their entirety.

FIELD OF THE INVENTION

The presently disclosed subject matter relates generally to airbed systems, particularly valves for airbed systems capable of receiving pumps of various sizes for inflation.

BACKGROUND

Conventional airbeds, or air mattresses, as they are commonly referred, typically are used in lieu of traditional box-spring mattresses, memory foam mattresses, water beds, and other beds as temporary structures for sleeping. Generally, air mattresses comprise a soft and flexible material chamber with an air-tight seal that allows the air mattress to inflate during use and deflate after use. Typically, airbeds comprise an internal structure or tensioning structure that helps the airbed achieve its intended shape once the airbed is inflated. The internal structure also prevents the airbed from over-inflating.

While some air mattresses must be manually inflated by the human user, many air mattresses include a manual or an electric pump, which can be integrated or separately provided, to enable mechanical inflation. For external air pumps, air mattresses often comprise a valve for receiving the pump. Valves associated with air mattresses come in multiple size as do the air pumps used to inflate the air mattresses. As a result, to allow inflation, the valve size must correspond to the air pump size.

Accordingly, there is a need for an improved valve device capable of receiving air from pumps of various sizes for inflation. Embodiments of the present disclosure are directed to these and other considerations.

SUMMARY

Briefly described, embodiments of the presently disclosed subject matter relate to airbed systems and, in particular, airbed systems having improved valves capable of receiving pumps of various sizes for inflation.

Aspects of the present disclosure relate to an air mattress configured to receive air pumps of various size for inflation. In particular, certain aspects of the present disclosure relate to an air mattress having a valve comprising a top cover, a top ring, a middle valve cover attached to a valve base, a diaphragm, and a bottom ring. According to some embodiments, the middle valve cover comprises an adapter ring configured to attach to the middle valve cover and a default ring configured to attach to the valve cover. The default ring has a different diameter than the adapter ring. The default ring may have a diameter of 31 mm. Further, the default ring may be configured to allow a 31 mm air pump to inflate an air mattress comprising the middle valve cover. The adapter ring may have a diameter of 18 mm. The adapter may be configured to plug into the middle valve. The adapter ring may be removable from the air mattress. Moreover, the adapter ring may be configured to allow an 18 mm air pump to inflate an air mattress comprising the adapter ring. The middle valve cover may have grooves allowing it to be screwed onto the valve base. The diaphragm may allow connection between the valve base and the middle valve cover. The bottom ring may further facilitate connection between the middle valve cover and the valve base. In some embodiments, the middle valve cover may be attached to the valve base by other means known in the art. The top ring and/or bottom ring may be configured to cover at least a portion of the middle valve cover. The top ring may facilitate connection between the top cover and the middle valve cover.

The air mattress may further include an internal structure comprising a sheet connected to the interior surfaces of the top and bottom surfaces of an air mattress. According to some embodiments, the sheet may comprise a single piece of material have a plurality of apertures, forming a mesh (which may be referred to as a "mesh sheet" or "mesh web"). Each of the top and bottom surfaces may comprise a plurality of connection points, and the sheet may be attached to two or more top surface connection points and two or more bottom surface connection points. The sheet may be attached to the top surface and bottom surface in such a manner that it forms a web-like structure or a wavy 3-dimensional sinusoidal shape when the airbed is inflated. The internal structure may help the air mattress maintain its intended geometric shape when inflated. Further, the internal structure may prevent the air mattress from becoming over-inflated. Also, the internal structure may prevent the top and bottom surfaces of the air mattress from shearing (i.e., moving laterally relative to one another) when the air mattress is in use. Also, because such an internal structure is light-weight and adds little to the overall bulk of the air mattress, when deflated, the air mattress can be easily stowed away and transported.

Other embodiments of the present disclosure relate to a valve comprising a top cap configured to attach to a top valve, a middle valve, a top ring, a diaphragm and a bottom ring configured to allow the middle valve to attach to the valve base. According to some embodiments, the middle valve has a different diameter than the top valve. The top valve may have a diameter of 18 mm. Further, the top valve may be configured to allow an 18 mm air pump to inflate an air mattress comprising the middle valve cover. The middle valve may have a diameter of 31 mm. The top valve may be configured to attach to the middle valve. In some embodiments, the top valve and the middle may screw into one another for attachment. The middle valve may be configured to allow a 31 mm air pump to inflate an air mattress. The diaphragm may allow connection between the valve base and the middle valve. The diaphragm may be inserted into a region of the middle valve to allow connection between the valve base and the middle valve. The bottom ring may further facilitate connection between the middle valve and the valve base. In some embodiments, the middle valve may be attached to the valve base by other means known in the art. The top ring and/or bottom ring may be configured to cover at least a portion of the middle valve. The top ring may facilitate connection between the top cover and the middle valve. The top cap may be attached by placing the top cap over the top valve and the middle while the two are connected.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

DETAILED DESCRIPTION

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Embodiments of the disclosed technology include an airbed mattress having a valve capable of receiving pumps of various sizes. In various embodiments, a valve may provide an air mattress the ability to receive multiple pumps of different sizes. Further, because larger pumps can be received, the valve allows for faster inflation. The valve also provides for inflation by automated pumps and hand pumps as the sizes vary accordingly.

Referring now to the figures, wherein like reference numerals represent like parts throughout the views, embodiments of the valve and the internal airbed structure will be described in detail.

Figure 1A:
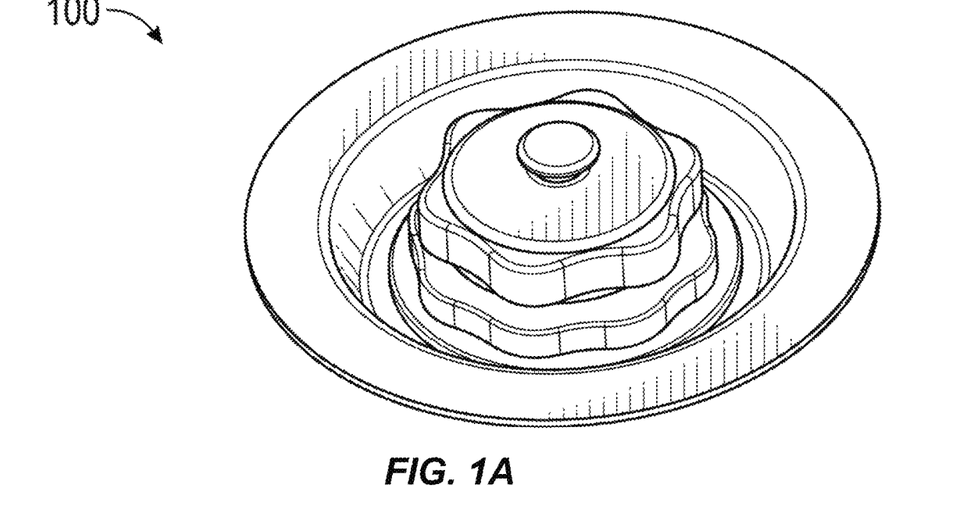
FIG. 1A is a top view of an assembled valve, in accordance with an example embodiment of the presently disclosed subject matter.

FIG. 1A shows a top view of an assembled valve 100. Valve 100 may comprise various materials. For example, valve 100 and/or its components may be constructed from a combination of plastic, polyvinyl chloride ("PVC"), rubber, metal, or any other suitable material or combination of materials to provide the desired qualities described herein. Further, valve 100 may vary in size and positioning. Valve 100 may be positioned on a top surface, a bottom surface, and/or a side surface of an air mattress. It is further contemplated that an air mattress may comprise a plurality of valves 100.

Figure 1B:
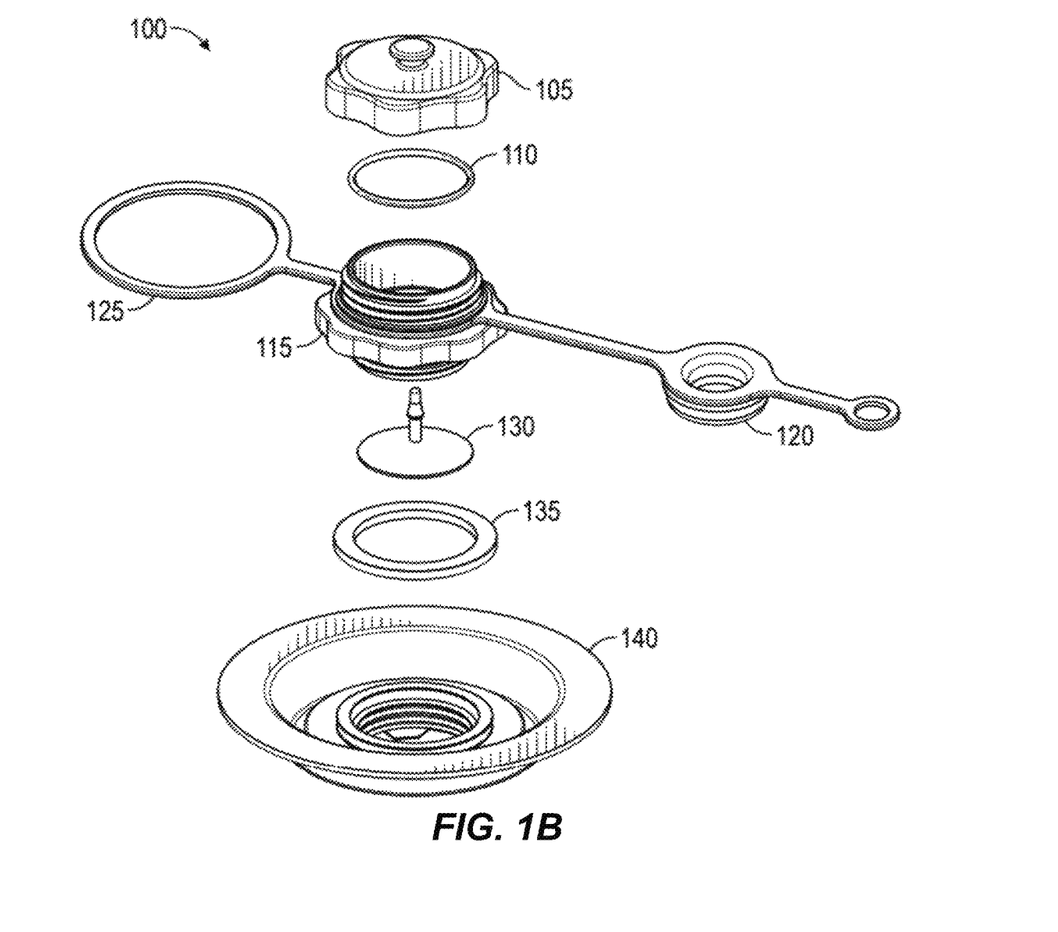
FIG. 1B is an exploded view of components of a valve, in accordance an example embodiment of with the presently disclosed subject matter.

FIG. 1B illustrates an exploded view of components of a valve 100. The components and arrangements shown in FIG. 1B are not intended to limit the disclosed embodiments as the components used to implement the disclosed processes and features may vary. Valve 100 may include a top cover 105, a top ring 110, a middle valve 115, an adapter ring 120, a default ring 125, a diaphragm 130, a bottom ring 135, and a valve base 140. The top cover 105 may include grooves capable of attachment by a screwing motion. The top cover 105 may attach to the middle valve 115. As part of attaching to middle valve 115, the top cover 105 may envelop at least portion of the middle valve 115. In some embodiments, the top cover 105 may attach to the middle valve 115 by other means known in the art.

The top ring 110 may be inserted between the middle valve 115 and the top cover 105 during attachment. The top ring 110 may reduce friction and/or wear of the middle valve 115 and/or the top cover 105. The middle valve 115 may be connected to the default ring 125 and/or the adapter ring 120. The adapter ring 120 may have grooves allowing attachment to the middle valve 115 through a screwing motion. The adapter ring 120 may have a diameter of 18 mm. As a result, when the adapter ring 120 attaches to the middle valve 115, the adapter ring 120 may allow the valve 100 to fit an air pump having a nozzle size of 18 mm. In some embodiments, the adapter ring 120 may attach to the middle valve 115 by other means known in the art.

The default ring 125 and the adapter ring 120 may be connected to the middle valve 115 by the same connection. The connection may be flexible such that the adapter ring 120 and/or the default ring 125 are able to bend over a top portion of the middle valve 115. When the top cover 105 is disconnected from the middle valve 115, the middle valve 115 is exposed. The middle valve may have a diameter of 31 mm. The default ring 125 may also have a diameter of 31 mm. Accordingly, the middle valve and/or default ring may allow the valve 100 to fit an air pump having a nozzle size of 31 mm.

When the air pressure of the air mattress 400 is inflated, i.e., the air pressure is near capacity, a top portion of the diaphragm 130 may enter an opening of a bottom portion of the middle valve 115 such that a connection is created. At this point, the connection between the diaphragm 130 and the middle valve 115 provides closure of the air valve, which prevents air from entering or exiting the air mattress 400. Conversely, when the air pressure of the mattress 400 is deflated, space exits between the top portion of the diaphragm 130 and the bottom portion of middle valve 115 such that air may enter the mattress 400 for inflation.

A bottom portion of the diaphragm 130 may positioned within the valve base 140. The bottom ring 135 may be positioned between the valve base 140 and the diaphragm 130. The bottom ring 135 may reduce friction and/or wear of the middle valve 115 and/or the valve base 140.

Figure 1C:
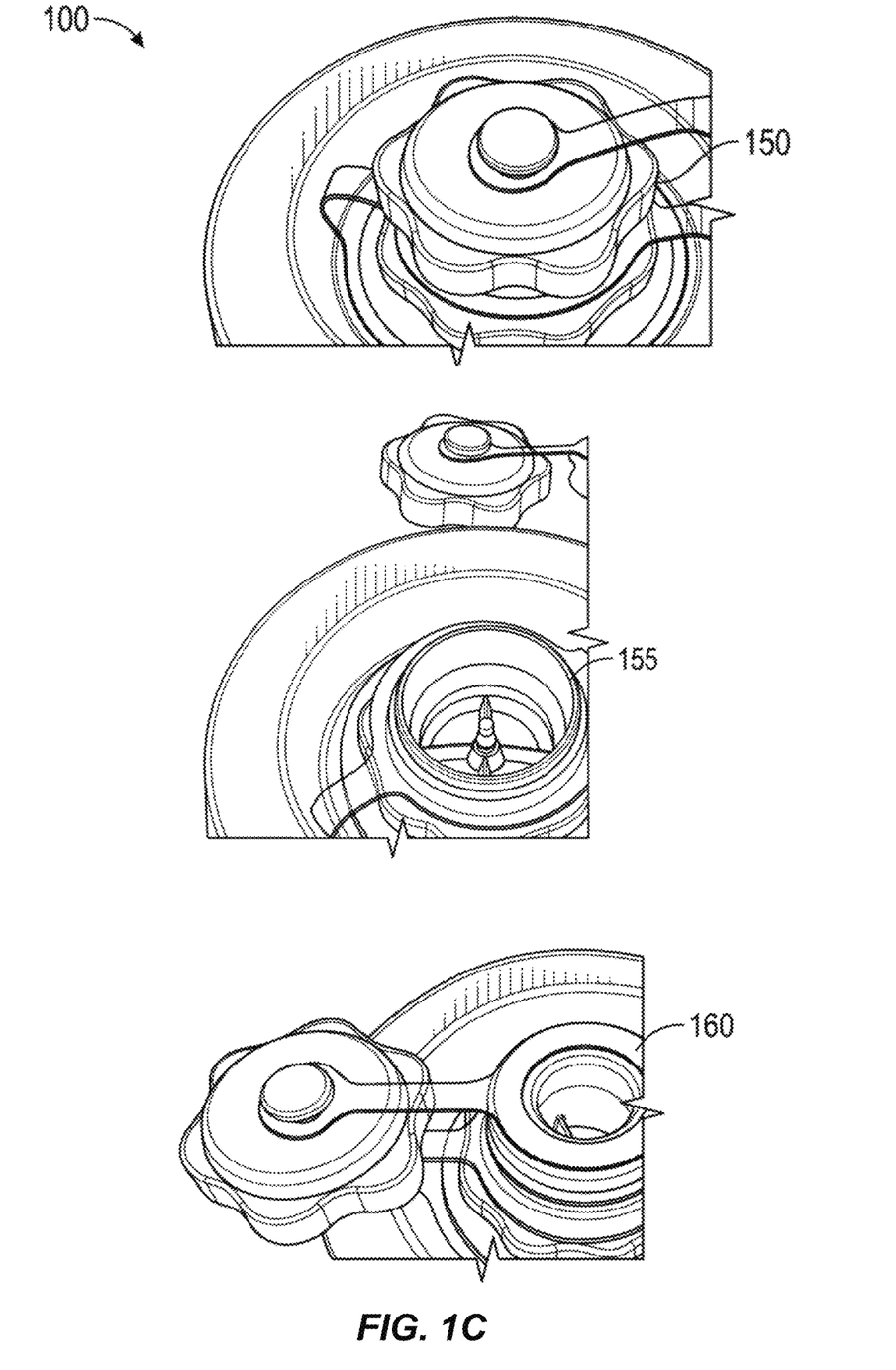
FIG. 1C illustrates stages of assembly of a valve, in accordance with an example embodiment of the presently disclosed subject matter.

FIG. 1C illustrates stages of assembly of a valve. At 150, valve 100 is closed (i.e., the top cover 105 is connected to a top portion of the middle valve 115). At 155, the top cover 105 is disconnected from a top portion of middle valve 115. When the top cover 105 is disconnected from a top portion of the middle valve 115, the middle valve 115 is exposed and therefore, the valve 100 may receive air from an air pump having a diameter of 31 mm. At 160, the top cover 105 is disconnected from a top portion of middle valve 115. However, adapter ring 120 is connected to the middle valve 115. Therefore, the valve 100 may receive air from an air pump having a diameter of 18 mm.

Figure 2A:
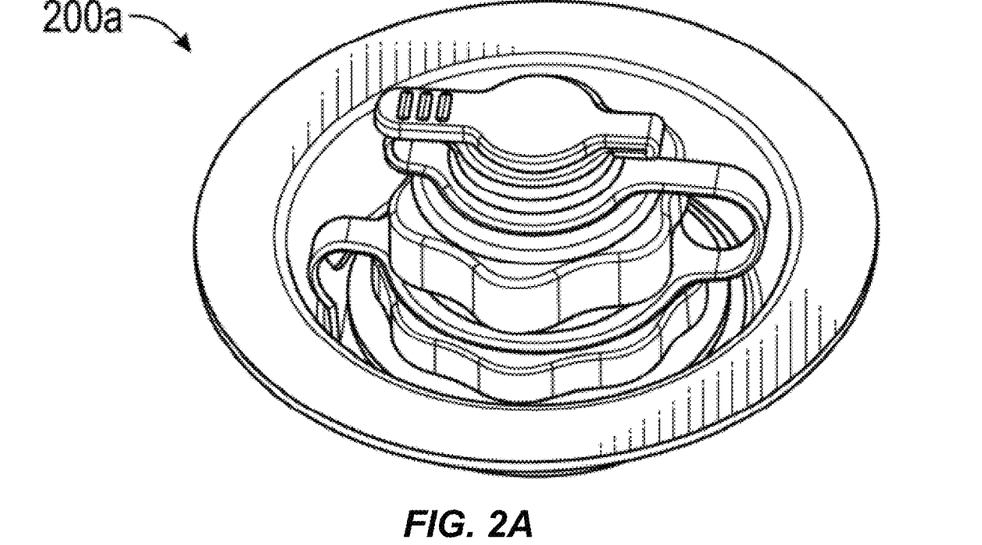
FIG. 2A is a top view of an assembled valve, in accordance with an example embodiment of the presently disclosed subject matter.

FIG. 2A shows atop view of an assembled valve. Similar to valve 100, valve 200 may comprise various materials. For example, valve 200 and/or its components may be constructed from a combination of plastic, polyvinyl chloride ("PVC"), rubber, metal, or any other suitable material or combination of materials to provide the desired qualities described herein. Further, valve 200 may vary in size and positioning. Valve 200 may be positioned on a top surface, bottom surface, and/or a side surface of an air mattress. It is further contemplated that an air mattress may comprise a plurality of valves 200.

Figure 2B:
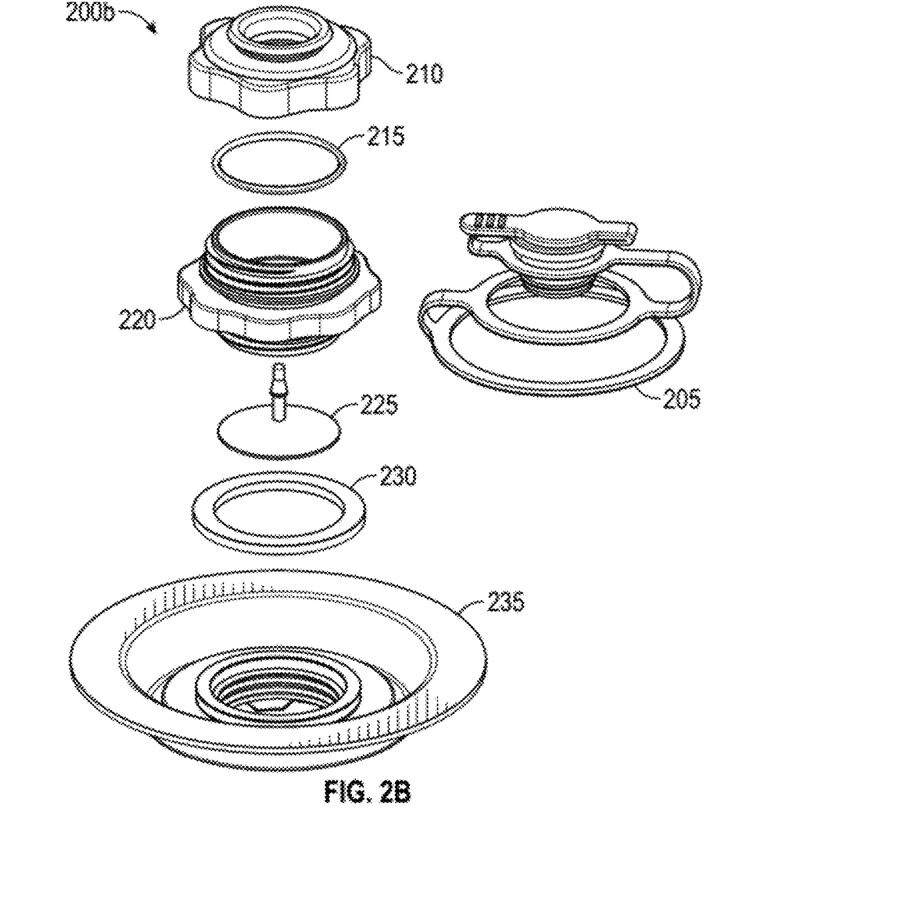
FIG. 2B is an exploded view of components of a valve, in accordance an example embodiment of with the presently disclosed subject matter.

FIG. 2B illustrates an exploded view of components of valve 200, according to embodiments of the present disclosure. The components and arrangements shown in FIG. 2B are not intended to limit the disclosed embodiments as the components used to implement the disclosed processes and features may vary. Valve 200 may include a top cap 205, a top valve 210, atop ring 215, a middle valve 220, a diaphragm 225, a bottom ring 230, and a valve base 235. The top cap 205 may comprise a combination of plastic, polyvinyl chloride ("PVC"), rubber, metal, or any other suitable material or combination of materials. The top cap 205 may be attachable to the valve base 235, the top valve 210, and/or the middle valve 220. The top cap 205 may include one or more circular rings capable of enveloping at least a portion of the middle valve 220, and/or at least a portion of the valve base 235. The one or more circular rings of the top cap 205 may be attached to one another at one or more points of attachment. The one or more circular rings of the top cap 205 may provide the top cap 205 attachment the middle valve 220 and/or the valve base 235. When valve 200 is assembled, each of the one or more circular rings of the top cap 205 may fit between an attachment of the top valve 210 and the middle valve 220, and/or an attachment of the middle valve 220 and the valve base 235. The top cap 205 may include a lid capable of connecting and disconnecting from the body of the top cap 205 such that an opening and closing feature are provided. When the lid of the top cap 205 is connected to the body of the top cap 205, the lid may also be connected to the top valve 210. When the lid of top cap 205 is disconnected from the body of top cap 205, an opening is provided such that top valve 210 is exposed. Top valve 210 may have a diameter of 18 mm. As a result, the valve 200 may receive air from an air pump having a diameter of 18 mm.

The top valve 210 may include an opening at the top portion capable of receiving at least a portion of the top cap 205. The top valve 210 may include grooves within an inner portion capable of attaching to another body having similar grooves through a screwing motion. The middle valve 220 may screw into the top valve 210 to create attachment. In some embodiments, the top valve 210 may attach to the middle valve 220 by other means known in the art. As part of attaching to middle valve 220, the top valve 210 may envelop at least a portion of the middle valve 220.

The top ring 215 may be inserted between the middle valve 220 and the top valve 210 during attachment. The top ring 215 may reduce friction and/or wear of the middle valve 220 and/or the top cover 210. The middle valve 220 may have a diameter of 31 mm. The top valve 210 may be disconnected/unattached from the middle valve 220 by an unscrewing motion. When the top valve 210 is unattached from the middle valve 220, an opening is provided such that middle valve 220 is exposed. As a result, the middle valve 220 may allow the valve 200 to fit an air pump having a nozzle size of 18 mm.

As described similarly in reference to FIG. 1B, when the air pressure of the air mattress 400 is inflated, i.e., the air pressure is near capacity, a top portion of the diaphragm 225 may enter an opening of a bottom portion of the middle valve 220 such that a connection is created. At this point, the connection between the diaphragm 225 and the middle valve 220 provides closure of the air valve, which prevents air from entering or exiting the air mattress 400. Conversely, when the air pressure of the mattress 400 is deflated, space exists between the top portion of the diaphragm 225 and the bottom portion of middle valve 220 such that air may enter the mattress 400 for inflation.

A bottom portion of the diaphragm 225 may positioned within the valve base 235. The bottom ring 230 may be positioned between the valve base 235 and the diaphragm 225. The bottom ring 230 may reduce friction and/or wear of the middle valve 220 and/or the valve base 235.

Figure 2C:
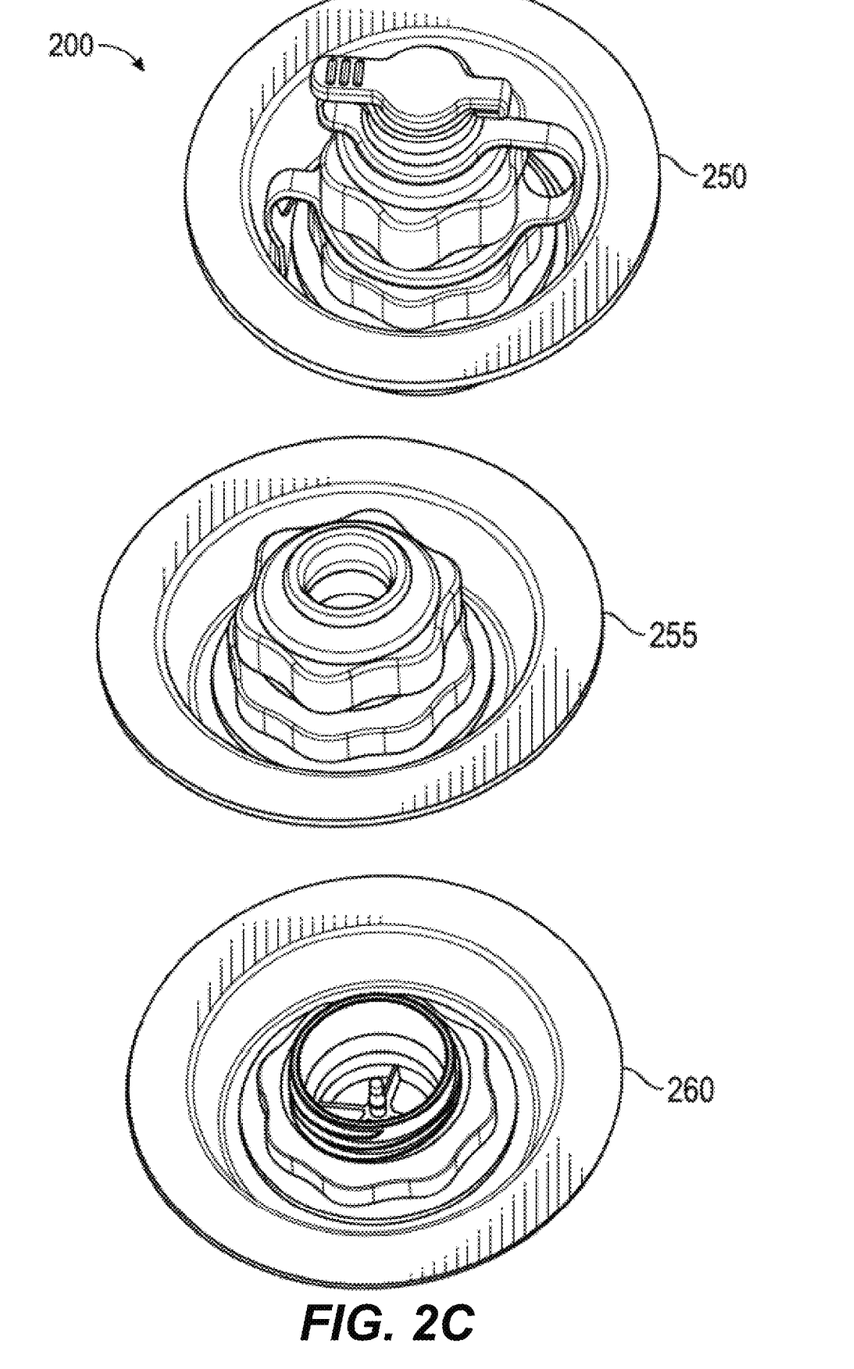
FIG. 2C illustrates stages of assembly of a valve, in accordance with an example embodiment of the presently disclosed subject matter.

FIG. 2C illustrates stages of assembly of a valve. At 250, valve 200 is closed (i.e., the lid of the top cap 205 is connected to the body of top cap 205, and top cap 205 is connected to top valve 210). At 255, the top cap 205 is disconnected from the top valve 210 and the middle valve 220. As shown at 255, when the top cap 205 is disconnected from the top valve 210 and the middle valve 220, the top valve 210 may be exposed. A top portion of the top valve 210 may include an opening. When the top valve 210 is exposed, valve 200 may receive air from an air pump having a diameter of 18 mm. At 260, the top valve 210 is disconnected from the middle valve 220. As a result, a top portion of the middle valve 220 is exposed. The top portion of the middle valve 200 may have an opening allowing a flow of air into the valve. When the middle valve 220 is exposed, valve 200 may receive air from an air pump having a diameter of 31 mm.

Figure 3:
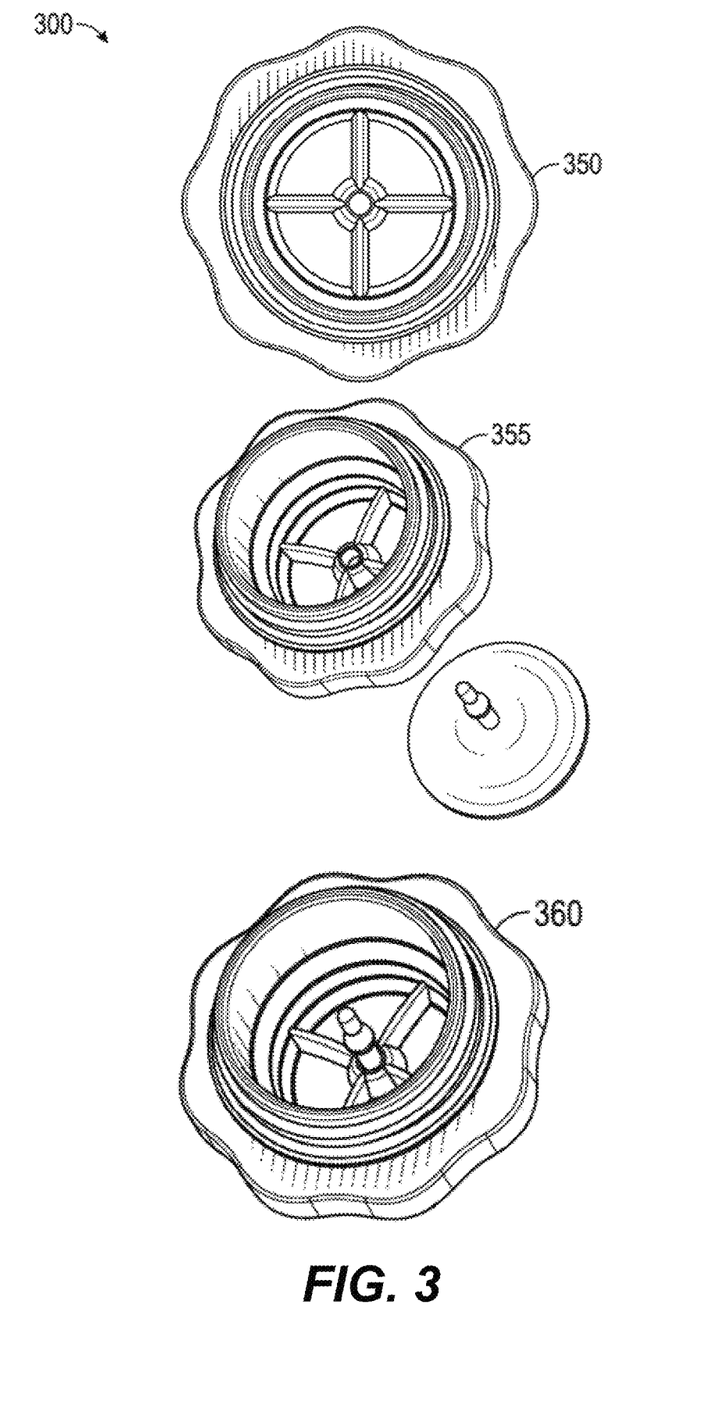
FIG. 3 illustrates stages of assembly of a middle valve section of a valve, in accordance with an example embodiment of the presently disclosed subject matter.

FIG. 3 illustrates stages of assembly of a middle valve section of a valve. As may be appreciated by those skilled in the art, the middle valve 220 may be a component of valve 100 and/or valve 200. At 350, the bottom portion of middle valve 220 can be seen. In this view, middle valve 220 is unattached from the diaphragm 225. This view is consistent with the air mattress 400 being deflated and in a state where the diaphragm 225 does not block air from entering the valve 200. At 355, the diaphragm 225 is shown with a top most portion facing upwards. The middle valve 220 is shown from a top view. As can be seen, the middle valve 220 has four cylindrical portions forming a cross shape at a bottom portion. The four cylindrical portions attach to an inner portion of the middle valve 220 and form a circular opening toward a middle portion of the inner middle valve 220. The top most portion of the diaphragm 225 may have a diameter similar in size to the formed circular opening of middle valve 200 such that the diaphragm 225 may fit into the circular opening. Also, in this view the air mattress 400 is in a deflated state such that the diaphragm 225 does not prevent air from entering the valve 200 for inflation. At 360, the diaphragm 225 is connected to the middle valve 220. In this view, the air mattress 400 is inflated such that the diaphragm 225 prevents air entering the valve 200.

Figure 4:
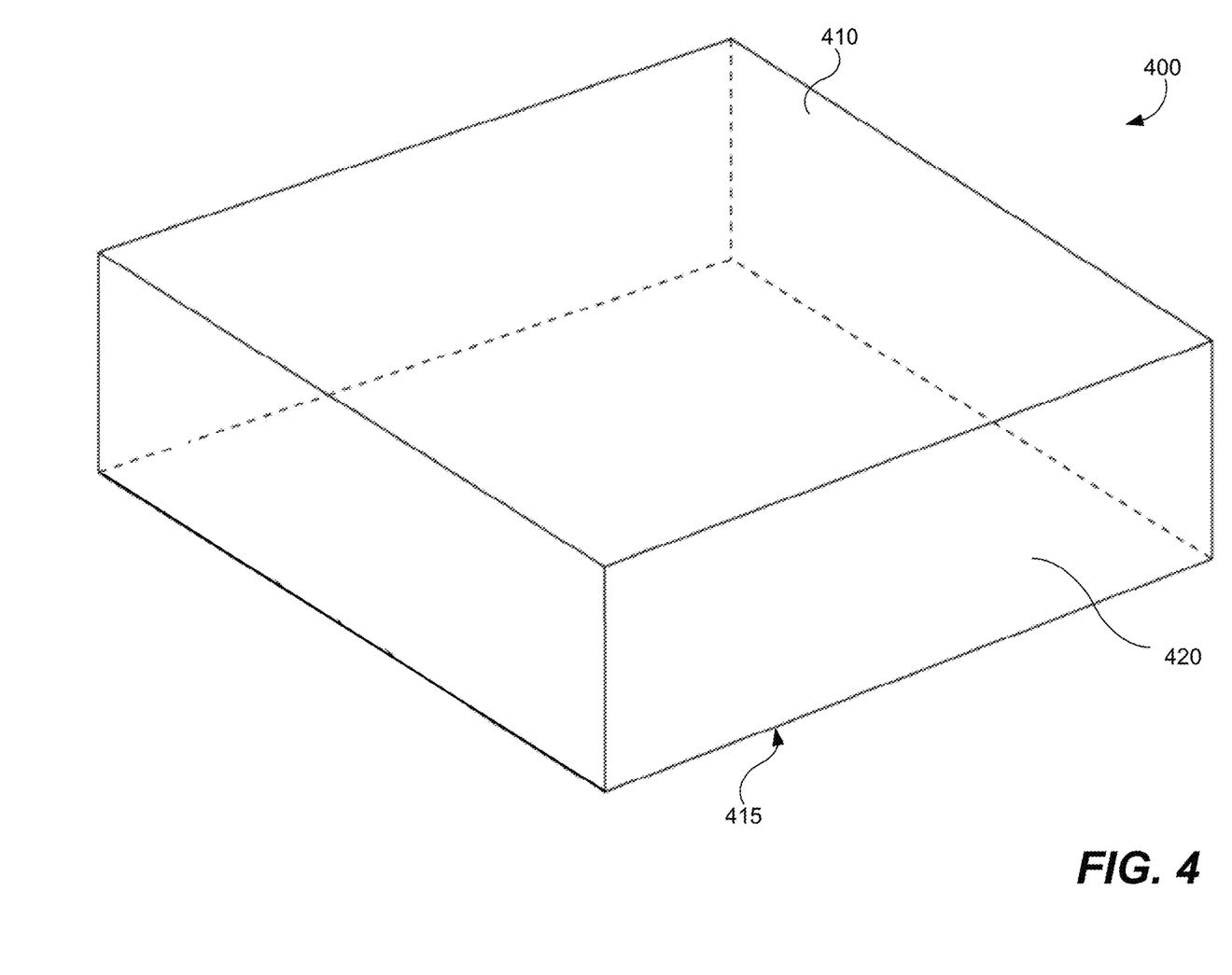
FIG. 4 is a schematic overview of an air mattress, in accordance with an example embodiment of the presently disclosed subject matter.

FIG. 4 is an overview of an air mattress 400. Air mattress 400 may vary in size once inflated based on the desired dimensions and/or number of users. For example, air mattress 400 may be a twin, full, queen, or king size bed. In some embodiments, air mattress 400 may be constructed out of polyvinyl chloride ("PVC"). It is contemplated, however, that other materials such as other plastics or rubber may be used. Further, as shown in FIG. 4, the air mattress 400 may comprise a top surface 410 and bottom surface 415 as well as side surfaces (e.g., side surface 420). Air mattress 400 may further include valve 100, 200, and/or 300.

Figure 5:
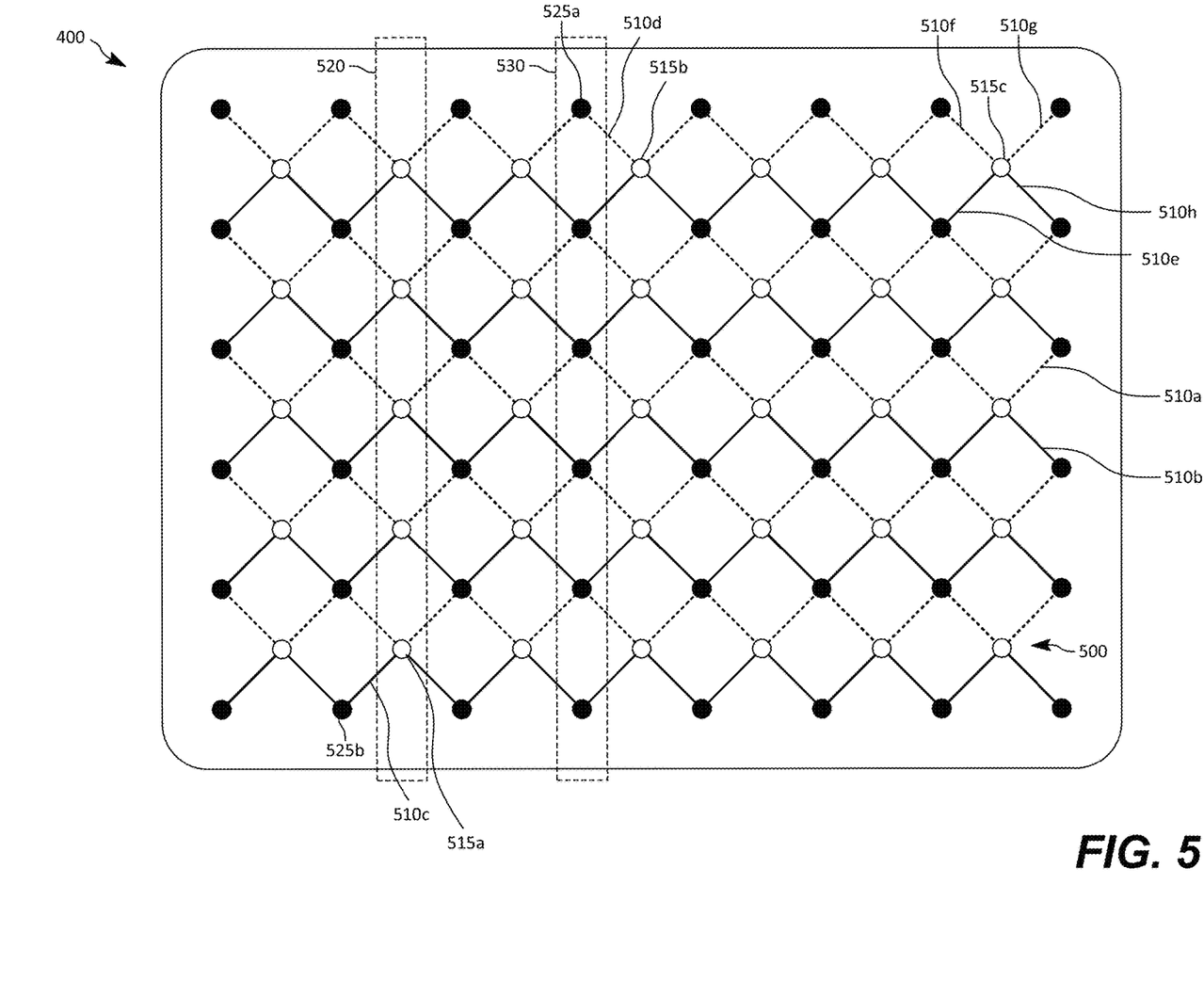
FIG. 5 is a top view of an air mattress having a strip-based internal structure, in accordance an example embodiment of with the presently disclosed subject matter.

FIG. 5 is a top view of an embodiment of an air mattress 400 comprising an internal structure 500. As discussed, in some embodiments, an internal structure 500 of an air mattress 400 may be included in the interior of the air mattress 400. The internal structure 500 may help the air mattress 400 achieve and maintain its intended shape once the air mattress 400 is inflated. Further, an internal structure 500 may prevent the air mattress 400 from over-inflating. Similarly, the internal structure 500 may prevent the top surface (e.g., top surface 410) and the bottom surface (e.g., bottom surface 415) from shearing (i.e., moving laterally relative to each other).

In some embodiments, an internal structure 500 may comprise a plurality of connection strips 510 (e.g., strips 510a, 510b) having a predetermined length that are attached (i.e., joined, connected, affixed) to one or more of the top surface 410 and bottom surface 415 of the air mattress 400. In some embodiments, a connection strip 510 may be constructed from PVC or various other fiber, fabric, or film that is suitable for a particular application. In some embodiments, a connection strip 510 may be constructed from a single piece of material (e.g., the connection strip 510 may be a single, continuous strip of PVC). In some embodiments, a connection strip 510 may be constructed from a collection (i.e., a plurality) of materials, fibers, or strings.

As shown in FIG. 5, in some embodiments, the air mattress 400 can be transparent, thereby providing a view of the plurality of connection strips 510 (e.g., connection strips 510a, 510b) comprising the internal structure 500. Further, the transparency of the air mattress 400 provides a view of top surface connection points 515, as highlighted by dashed box 520, which includes top surface connection point 515a. Further, the transparency of the air mattress 400 provides a view of bottom surface connection points 525, as highlighted by dashed box 530, which includes bottom surface connection point 525a. In some embodiments, connection points (e.g., top surface connection points 515 and bottom surface connection points 525) are on opposing interior surfaces of the top surface 410 and bottom surface 415. Accordingly, in such embodiments, the connection points are on the interior of the air mattress 400. Further, in some embodiments, connection strips 510 may attach directly to connection points 515 and 525. In some embodiments, for example, a connection strip 510 may be welded to top and bottom surface attachment points 515, 525. Further, in some embodiments, a connection strip 510 may be glued, sewn, adhered, or otherwise attached to top and bottom surface attachment points 515, 525.

As shown in FIG. 5, in some embodiments, a connection strip 510 may attach between a top surface connection point 515 and a bottom surface connection point 525. In some embodiments, when an air mattress 400 is inflated, as shown in FIG. 5, a connection strip 510 may angle from top surface 410 toward bottom surface 415, or vice versa. For example, as shown in FIG. 5, connection strip 510c angles from bottom surface connection point 525b toward top surface connection point 515a. Similarly, as shown in FIG. 5, connection strip 510d angles from bottom surface connection point 525a toward top surface connection point 515b, according to some embodiments. As will be appreciated, when configured in the manner described and shown in FIG. 5, angled connection strips (e.g., connection strip 510c and 510d) may comprise an internal structure 500 with sufficient strength to prevent the air mattress 400 from over-inflating and to prevent the top surface and bottom surface (e.g., 410 and 415) from moving laterally in relation to one another (i.e., shearing).

Further, in some embodiments, a plurality of connection strips 510 may connect to a particular top surface connection point 515 or bottom surface connection point 525. For example, in some embodiments and as shown in FIG. 5, four connection strips 510e-h attach to a single connection point (i.e., top surface connection point 515c). It is contemplated that in various embodiments, any number of connection strips 510 could connect to a particular connection point (e.g., a top surface connection point 515 or bottom surface connection point 525. As shown in FIG. 5, in configurations in which multiple connection strips (e.g., 510e-h) attach to a single connection point (e.g., top surface connection point 515c), and in which the connection strips 510 angle from a top surface connection points 515 toward bottom surface connection points 525, and vice versa, the plurality of connection strips 510 may constitute an internal structure 500 having a web-like configuration. According to some embodiments, a plurality of top surface connection points 515 may be spaced apart at predetermined distances or intervals, and a plurality of bottom surface connection points may also be spaced apart at predetermined distances or intervals. In some embodiments, a plurality of bottom surface connection points 525 may be located on the bottom surface 415 in positions that are offset relative to the locations of the plurality of top surface connection points 515 on the top surface 410. As will be appreciated, an internal structure 500 having a web-like configuration may further aid in helping an air mattress 400 maintain its intended shape and prevent the air mattress 400 from becoming over-inflated. Further, an internal structure 500 having a web-like configuration may help prevent the top surface 410 and bottom surface 415 of an air mattress 400 from shearing or moving laterally relative to one another.

As noted above, in some embodiments, a connection strip 510 may be constructed from a single piece of material. But, in some embodiments, a connection strip 510 may comprise a plurality of individual strips or strands. In some embodiments, each of the plurality of individual strips that comprise a connection strip may attach to the same top surface connection point 515 and bottom surface connection point 525. In some embodiments, however, a connection strip 510 may comprise attachment strips (or, alternatively, weld strips) at each end of the connection strip 510. An attachment strip may be a strip of material or a patch, that may be used to affix a portion of an internal structure 500 to a portion of the air mattress 400. For example, an attachment strip may be a strip of PVC that may be welded to a surface of the air mattress 400. In some embodiments, a portion of an internal structure 500, for example, a portion of a connection strip 510, may be sandwiched between an attachment strip and a surface of the air mattress 400 and the attachment strip may be welded to the surface of the air mattress 400 to secure the connection strip 510 to it. In such embodiments, the plurality of individual strips or strands comprising the connection strip 510 may be held in place by the opposing attachment strips, and the attachment strips may be affixed to the top and bottom surface connection points (i.e., 515 and 525). For example, in some embodiments, an attachment strip, a portion of a connection strip 510, and a portion of either the top surface 410 or bottom surface 415 may be welded together at atop surface connection point 515 or bottom surface connection point 525.

Figure 6:
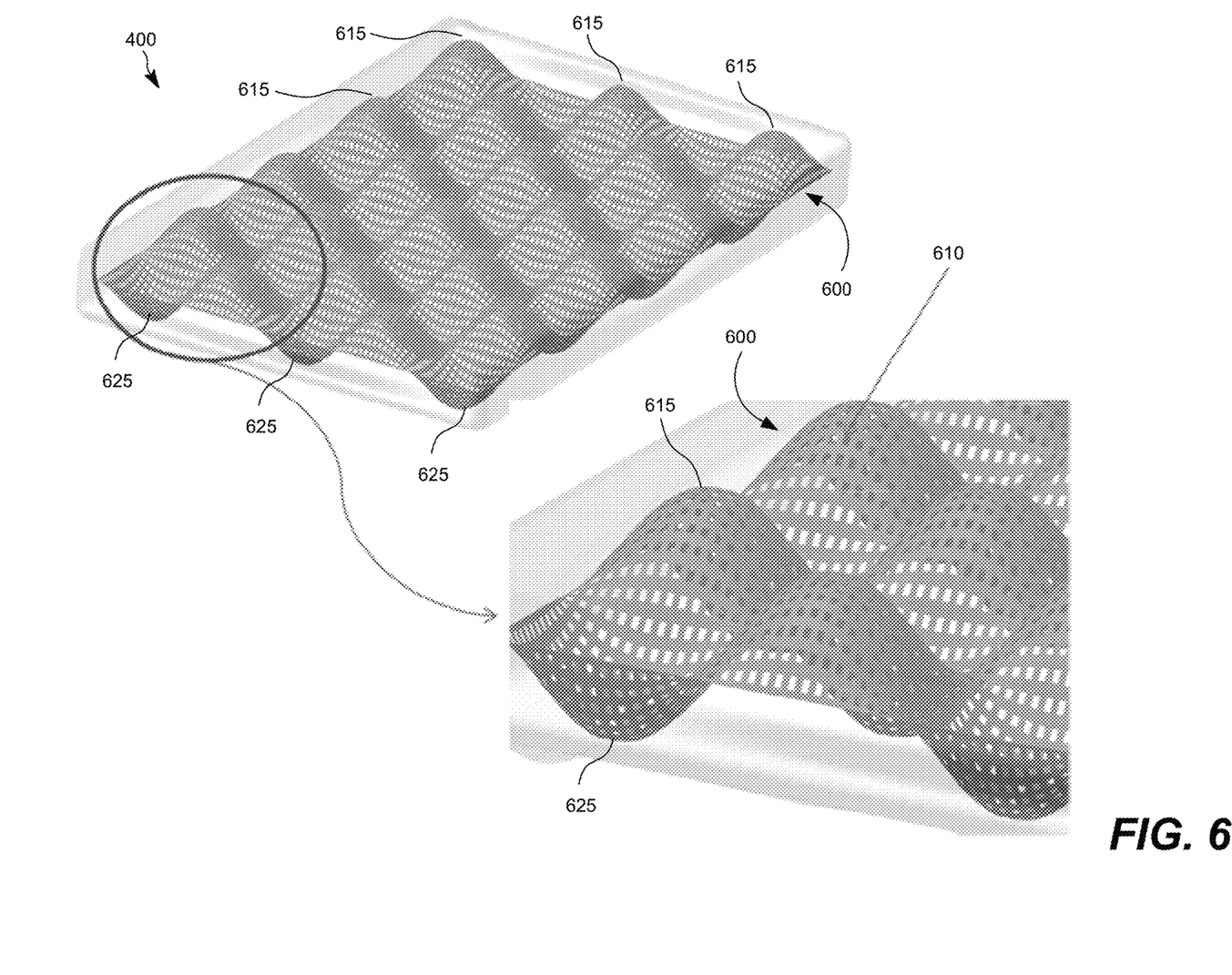
FIG. 6 is a perspective view of an air mattress having a mesh-based internal structure including a detail view of a mesh-based internal structure, in accordance with an example embodiment of the presently disclosed subject matter.

FIG. 6 is a perspective view of an air mattress 400 comprising an internal structure 700 that is comprised of a single sheet of material. According to some embodiments, the internal structure 700 may be a continuous piece of material. In some embodiments, the internal structure may be a mesh structure 610 (which may also be referred to as a "mesh web" or a "mesh sheet") that includes one or more apertures forming a mesh. In some embodiments, a mesh structure 610 may be made of a single piece of material including a plurality of apertures. In some embodiments, an internal structure 600 of an air mattress 400 may be included in the interior of the air mattress 400 and may operate in a manner similar to internal structure 500 described above. For example, the internal structure 600 may help the air mattress 400 achieve and maintain its intended shape once the air mattress 400 is inflated. Further, internal structure 600 may prevent the air mattress from over-inflating. Similarly, the internal mesh structure 600 may prevent the top surface (e.g., top surface 410) and the bottom surface (e.g., bottom surface 415) from shearing (i.e., moving laterally relative to each other). In some embodiments, the outer edge of the internal structure 600 may be attached to the inner surfaces of the side surfaces 420.

In some embodiments, a mesh structure 610 may be constructed from PVC or various other fiber, fabric, or film that is suitable for a particular application. In some embodiments, a mesh structure 610 may be constructed form a single piece of material (e.g., the mesh structure 610 may be a single, continuous piece of fiber). In some embodiments, a mesh structure 610 may be constructed from a collection (i.e., plurality) of materials, fibers, or strings.

As shown in FIG. 6, in some embodiments, a mesh structure 610 may attach to the internal surface of an air mattress 400 at various top surface connection points 615 and bottom surface connection points 625. According to some embodiments, the top surface connection points 615 and bottom surface connection points 625 may be located in positions similar to those shown with respect to internal structure 500 and creating a 3D web-like structure as previously described above. For example, according to some embodiments, a plurality of top surface connection points 615 may be spaced apart at predetermined distances or intervals, and a plurality of bottom surface connection points may also be spaced apart at predetermined distances or intervals. In some embodiments, a plurality of bottom surface connection points 625 may be located on the bottom surface 415 in positions that are offset relative to the locations of the plurality of top surface connection points 615 on the top surface 410. Accordingly, in some embodiments, when air mattress 400 is inflated, the mesh structure 610 may take on a 3-dimensional, approximately sinusoidal shape with top and bottom "humps" extending in upwards and/or downwards directions when the airbed is inflated, as shown in FIG. 6. According to some embodiments, the peak of each top hump may attach to the air mattress 400 at a top connection point 615 and the trough of each bottom hump may attach to the air mattress 400 at a bottom connection point 625. As will be appreciated, an internal structure 600 having a web-like configuration may help prevent the top surface 410 and bottom surface 415 of an air mattress 400 from shearing and moving laterally relative to one another.

As described above, a mesh structure 610 may attach (i.e., join, connect, affix) to the top surface 410 and bottom surface 415 of the air mattress 400. In some embodiments, a mesh structure 610 may attach to the air mattress 400 at one or more top surface connection points 615 and one or more bottom surface connection points 625. In some embodiments, portions of a mesh structure 610 may be welded to top and bottom surface attachment points 615, 625. In some embodiments, portions of the mesh structure 610 may be attached to the air mattress 400 with one or more attachment strips. For example, in some embodiments, an attachment strip may be used to secure a portion of a mesh structure 610 to a top surface connection point 615 or a bottom surface connection point 625. According to some embodiments, portions of the mesh structure 610 may be attached to the air mattress 400 with one or more attachment strips. For example, a top connection point 615 may be sandwiched between an attachment strip and the top surface 410 and the three may be welded together. Likewise, a bottom surface connection point 625 may be sandwiched between an attachment strip and the bottom surface 415 and the three may be welded together. According to some embodiments, an attachment strip may be a PVC strip. Further, in some embodiments, a mesh structure 610 may be glued, sewn, adhered, or otherwise attached to top and bottom surface attachment points 615, 625.

Figure 7:
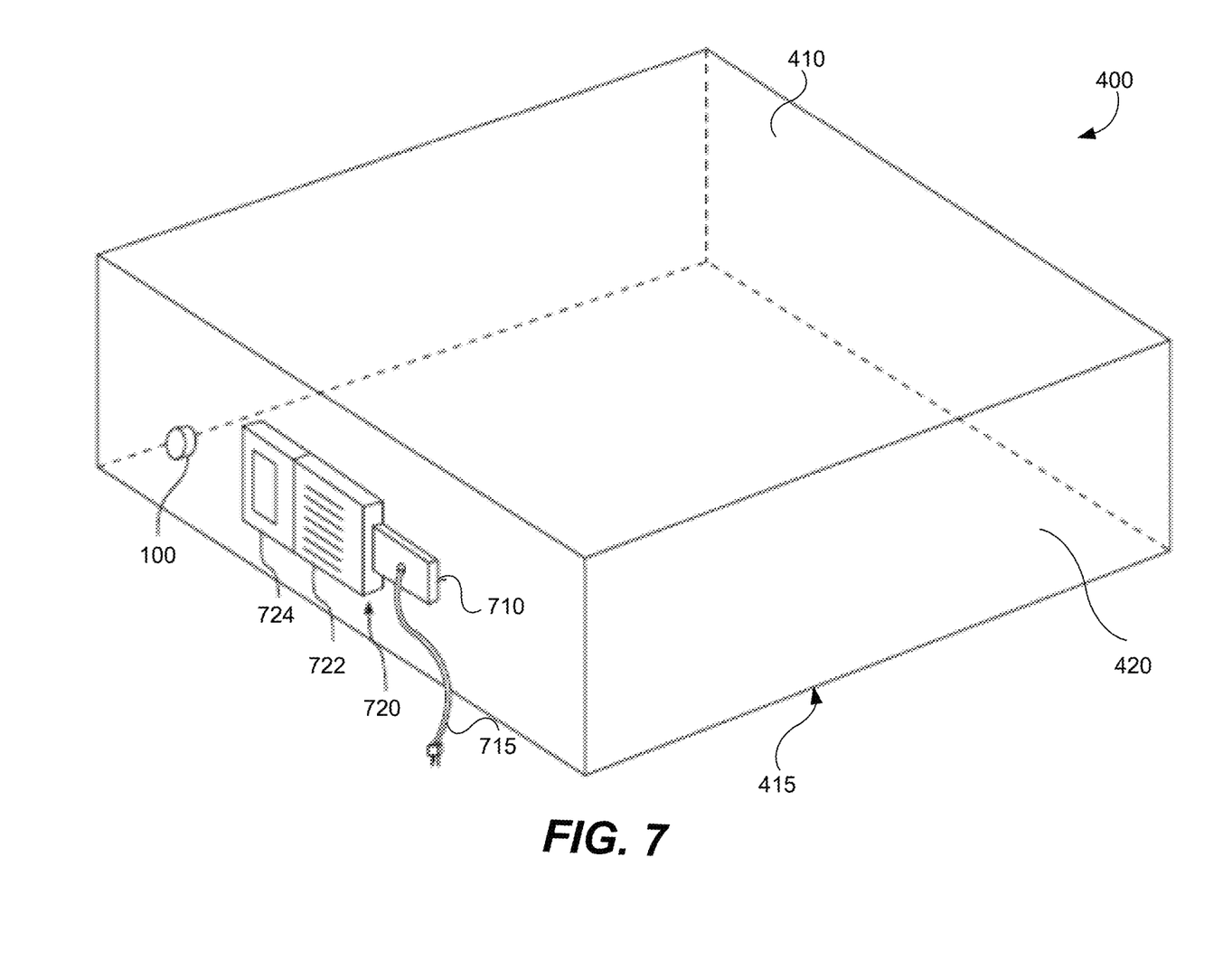
FIG. 7 is a schematic overview of an air mattress comprising various air mattress components, in accordance with an example embodiment of the presently disclosed subject matter.
Figure 8:
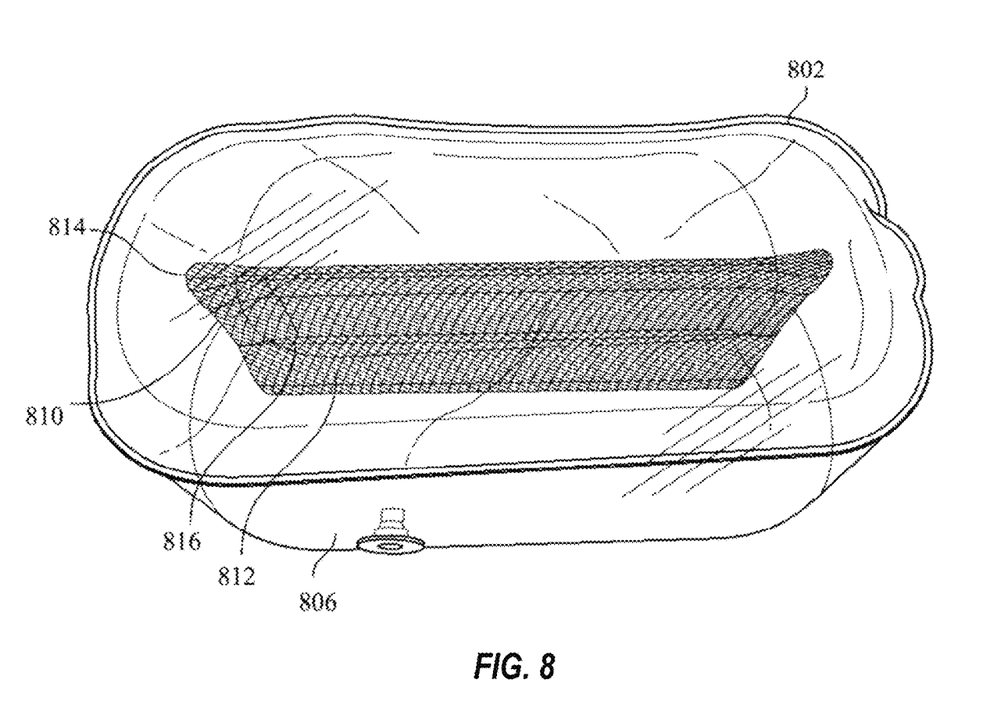
FIG. 8 is a photo of an air cushion, according to some example embodiments of the disclosed technology.
Figure 9:
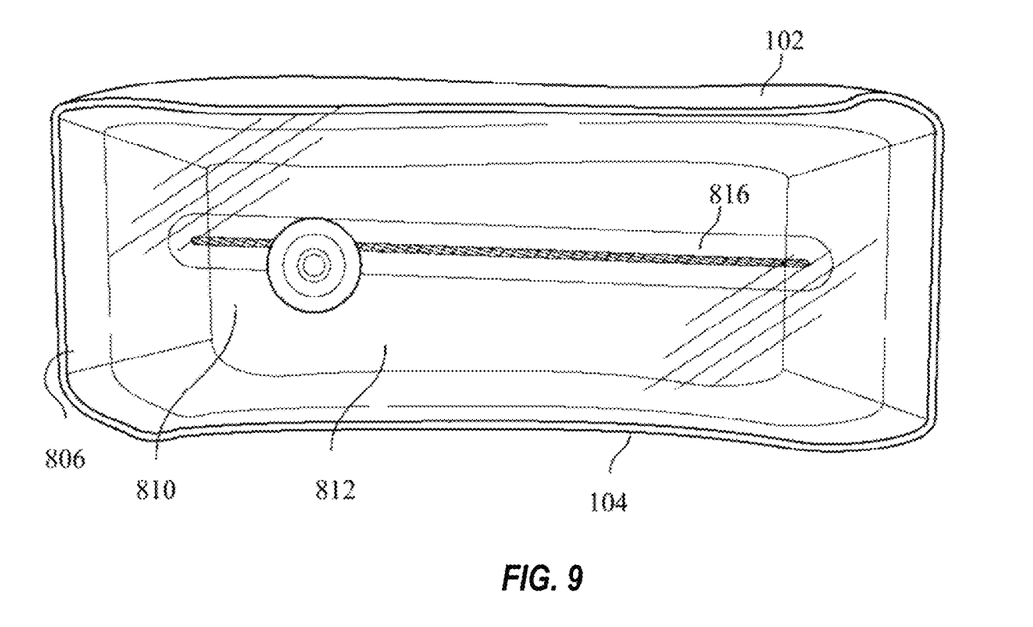
FIG. 9 is a photo of a side view of an air cushion, according to some example embodiments of the disclosed technology.
Figure 10:
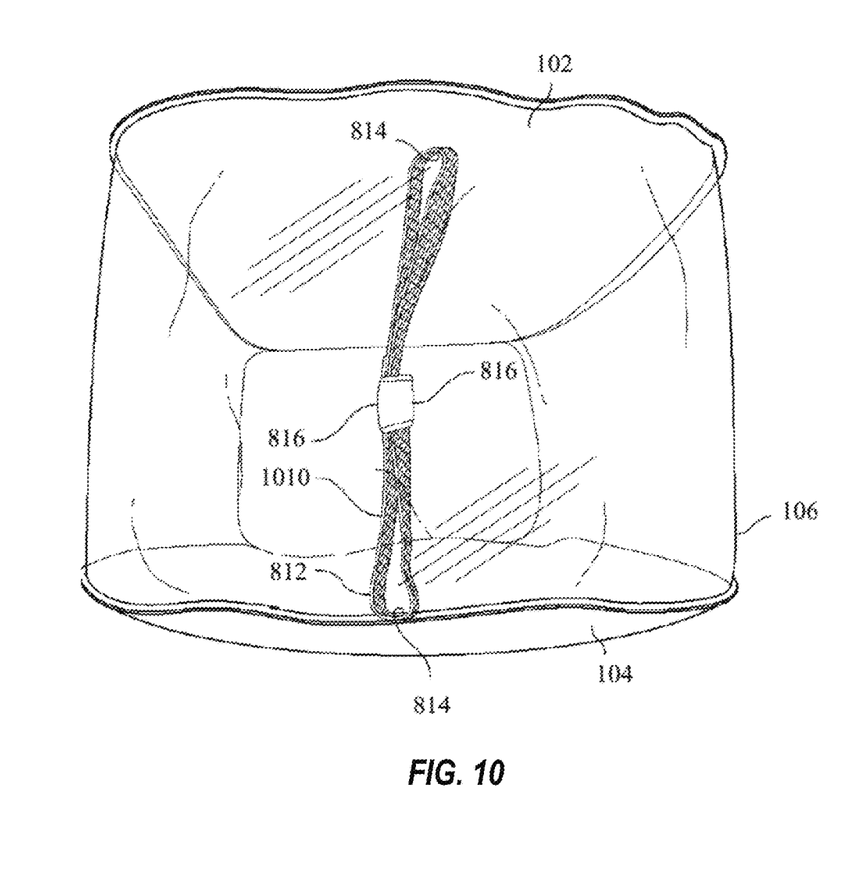
FIG. 10 is a photo of an end view of an air cushion, according to some example embodiments of the disclosed technology.
Figure 11:
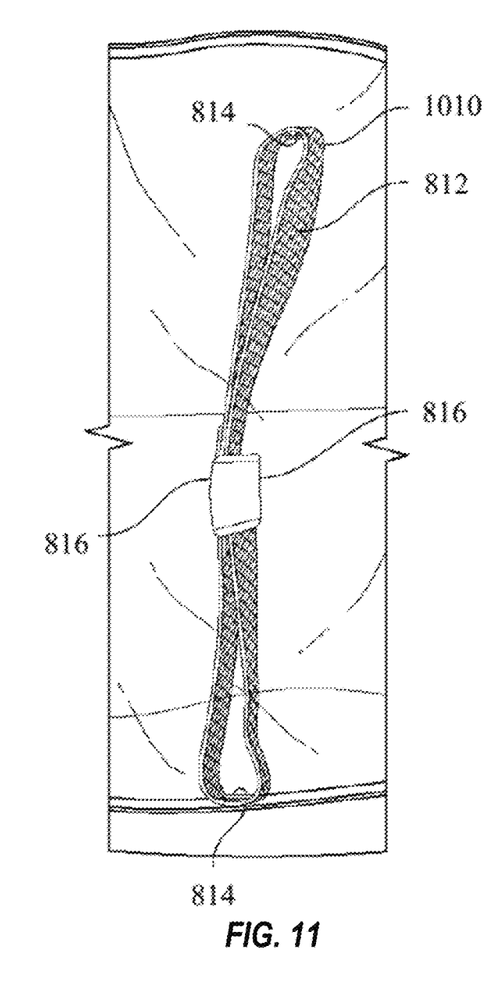
FIG. 11 is a photo of an internal support structure of an air cushion, according to some example embodiments of the disclosed technology.

FIG. 7 is an embodiment of an air mattress 400 comprising a top surface 410, bottom surface 415, a plurality of side surfaces (e.g., side surface 420), and various air mattress 400 components. Further, as shown in FIG. 7, in some embodiments, an air mattress 400 may comprise a portable power source 710. In some embodiments, a portable power source 710 may be a battery and provide direct current. In other embodiments, portable power source 710 may include a motor or generator and provide alternating current. It is contemplated that any portable power source may be used. Further, a portable power source 710 may be housed in a power source housing (not shown) on air mattress 400 for convenient transport. In some embodiments, a portable power source 710 may comprise a power plug 715, which may be attachable to portable power source 710. In some embodiments, however, power plug 715 may be used in lieu of portable power source 710. Power plug 715 may include a variety of power plugs, such as those configured to plug into USB ports and 120V standard outlets. As will be appreciated, while a portable power source 710 may be used in outdoor and indoor locations, a power plug 715 may be suited for indoor use when air mattress 100 is placed near an electrical outlet.

In some embodiments, an air mattress may comprise an air control system 720, which may be used to control air flow and to inflate and deflate an air mattress 400. In some embodiments, a portable power source 710 or a power plug 715 (or a combination of both) may provide power to an air control system 720. In some embodiments, an air control system 720 may include an air intake component 722 and a controller 724. An air intake component 722 may be configured to direct ambient air into the air mattress 400 during mattress inflation and direct air from the air mattress 400 during mattress deflation. In some embodiments, the air intake component 722 may comprise an outer seal that inhibits or allows the flow of outside air into the air control system 720. In some embodiments, the air intake component 722 also may include an inner seal (not shown) that inhibits or allows the flow of internal air between air control system 720 and the air chamber (i.e., interior) of an air mattress 400.

In some embodiments, a controller 724 may be configured to receive user input and control the opening or closing of inner and outer seals and/or inflating and deflating of the air mattress 400 via the air control system 720. In some embodiments, the controller 724 may include one or more processors having memory. Also, in some embodiments, the controller 724 may be configured to execute one or more operating modes. For example, operating modes may include inflation mode, deflation mode, air recirculation mode, and standby mode. In some embodiments, the controller 724 may include one or more electronic components that allow a user to switch between modes.

In some embodiments, inflation mode may begin when the controller 724 receives user input to inflate the air mattress 400. In some embodiments, inflation mode may last until the controller 724 receives additional user input to stop inflating the air mattress 400. In some embodiments, however, the controller 724 may automatically control the speed and duration of inflation based on a predetermined or user supplied air pressure for the air in the air mattress 400. During inflation mode, both the inner and outer seals may be open to allow ambient air to flow into the air mattress 400.

In some embodiments, deflation mode may begin when the controller 724 receives user input to deflate the air mattress 400. For example, in some embodiments, deflation mode may last until the controller 724 receives additional user input to stop deflating the air mattress 400. Further, in some embodiments, the controller 724 may automatically control the speed and duration of deflation based on a predetermined or user supplied air pressure for the air in the air mattress 400. During deflation mode, both the inner and outer seals may be open to allow ambient air to flow out of the air mattress 400.

According to some embodiments, an air recirculation mode may begin when the controller 724 receives user input to circulate air within air mattress 100. In doing so, the controller 724 may direct the outer seal to close while the inner seal remains open, thus allowing air to enter the air intake component 722, but not escape the air mattress 400. According to some embodiments, circulating air within an air mattress 400 may cause a vibrating or massaging pulse on the surface of the air mattress 400 and/or adjust air pressure via air control system 720. In some embodiments, air recirculation mode may last until the controller 724 receives additional user input to stop circulating air within the air mattress 400. Also, in some embodiments, the controller 724 may automatically control the time duration and/or interval to recirculate air within the air mattress 400.

In some embodiments, a standby mode may occur when the controller 724 receives power from portable power source 710 and/or power plug 715 and is not placed in another mode. For example, the controller 724 may operate in standby mode before receiving user input. In some embodiments, the controller 724 may also direct the inner seal to close to inhibit air recirculation. Also, in some embodiments, the controller 724 may direct the inner seal to remain open. It is contemplated that the air mattress 400 may only include the outer seal and not the inner seal, according to some embodiments.

In some embodiments, an air mattress 400 may comprise valve 100, 200, and/or 300. As shown, air mattress 400 may comprise valve 100. According to some embodiments, valve 100 may be configured to inhibit the flow of air out of the air mattress 400 when valve 100 is in a closed position and allow air flow out of air mattress 400 when 100 is in an open position.

FIGS. 8-11 depict an air cushion representative of an air mattress, in accordance with some embodiments of the disclosed technology. The air cushion depicted includes a single internal support structure 810, which includes a first side strip 816 positioned outside the loop 812 and proximate the overlapping ends and a second side strip 816 a second side strip 816 may be positioned outside the loop 812 and adjacent a portion of the loop 812 opposite the overlapping ends of the loop 812, as discussed above. As shown most clearly in FIGS. 10 and 11, attachment of the first side strip 816 to the second side strip 816 causes the loop 812 to "pinch" together at or near the first and second side strips 816. Though only a single support structure 1010 is shown, it is understood that a plurality of similar support structures could be used in an air mattress, according to the disclosed technology.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. But, other equivalent methods or composition to these described aspects are also contemplated by the teachings herein. Therefore, the present disclosure should not be limited to any single aspect, but rather construed in breadth and scope in accordance with the appended claims.

What is claimed is:

1. An inflatable air mattress comprising:
   a top panel;
   a bottom panel;
   one or more side panels attached to the top panel and the bottom panel to form a substantially airtight enclosure;
   an internal support structure attached to at least the top panel and the bottom panel; and
   an air valve assembly configured to control an ingress and an egress of air from the substantially airtight enclosure, the air valve assembly comprising:
      a base configured to attach to a portion of the inflatable air mattress,
      a middle valve configured to attach to the base and having a first diameter, the middle valve comprising: (i) a first end having a first threaded portion and (ii) a second end having a second threaded portion,
      a diaphragm member configured to attach to the middle valve,
      an adapter (i) having a portion with a second diameter that is smaller than the first diameter and (ii) detachably attached to a portion of the middle valve by a first portion of a flexible connection such that when it is attached, a user may use an inflation device with a first dimensioned output;
      a default ring configured to be flexibly attached and/or detached to the first end of the middle valve by a second portion of the flexible connection such that when the default ring is attached to the middle valve, the user may use a second inflation device having a second dimensioned output, wherein the second dimensioned output is larger than the first dimensioned output; and
      a cap removably coupled to the first threaded portion of the middle valve such that when the cap is coupled to the first threaded portion, the cap at least partially envelops the middle valve and the adapter.

2. The inflatable air mattress of claim 1, wherein the air valve assembly further comprises a sealing ring secured between the cap and the portion of the air valve.

3. The inflatable air mattress of claim 1, wherein the air valve assembly further comprises a sealing ring secured between the middle valve and the base.

4. The inflatable air mattress of claim 1, wherein the first diameter is 31 mm and the second diameter is 18 mm.

5. The inflatable air mattress of claim 1, wherein the base has a first end having a threaded portion, wherein the second threaded portion of the middle valve is configured to mate with the threaded portion of the first end of the base.

6. The inflatable air mattress of claim 5, wherein the adapter comprises:
   a first opening configured to receive the first end of the middle valve,
   a second opening configured to receive the second end of the middle valve, and
   a receiving portion configured to be inserted into the first end of the middle valve.

7. The inflatable air mattress of claim 6, wherein the cap comprises a first end having a threaded portion.

8. The inflatable air mattress of claim 7, wherein the threaded portion of the first end of the cap is configured to mate with the first threaded portion of the middle valve.

9. The inflatable air mattress of claim 1, wherein the adapter comprises a first end having a threaded portion and a second end comprising a receiving portion having a diameter equal to the second diameter.

10. The inflatable air mattress of claim 9, wherein the first threaded portion the middle valve is configured to mate with the threaded portion of the first end of the adapter.

11. The inflatable air mattress of claim 1, wherein the air valve assembly is attached to one of the one or more side panels.

12. The inflatable air mattress of claim 1, wherein the air valve assembly is attached to a portion of the top panel.

13. The inflatable air mattress of claim 1, wherein the internal support structure comprises:
   a length of material having a first end and a second end, the first end overlapping the second end to cause the length of material to form a loop;
   a first attachment strip positioned within the loop and attached to the top panel;
   a second attachment strip positioned within the loop and attached to the bottom panel; and
   a third attachment strip attached to the first end and the second end.

14. The inflatable air mattress of claim 13, wherein the third attachment strip is positioned outside the loop.

15. The inflatable air mattress of claim 13, wherein the third attachment strip is positioned within the loop.

16. The inflatable air mattress of claim 13 further comprising a fourth attachment strip positioned proximate the first and second ends and attached to the third attachment strip.

17. The inflatable air mattress of claim 16, wherein the fourth attachment strip is positioned within the loop.

18. The inflatable air mattress of claim 16, wherein the fourth attachment strip is positioned outside the loop and proximate a portion of the loop opposite the first and second ends.

* * * * *